Aug. 31, 1948.　　　J. M. WALTER　　　2,448,200
PLANER
Filed May 31, 1946
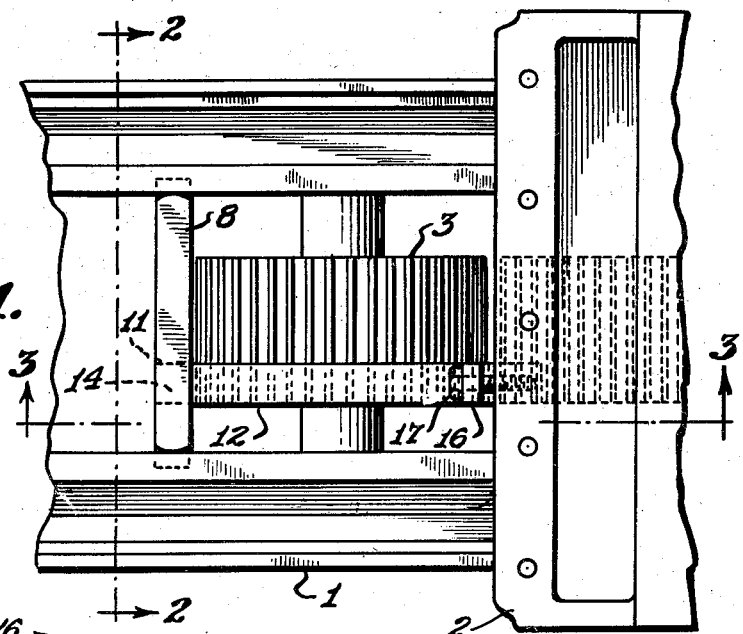
FIG.1.
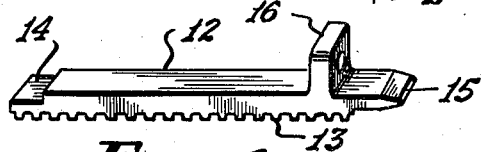
FIG.4.
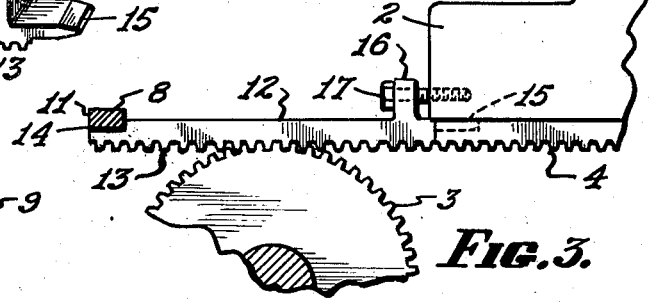
FIG.3.
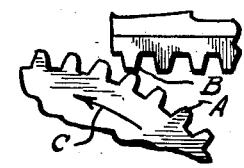
FIG.5.
FIG.6.
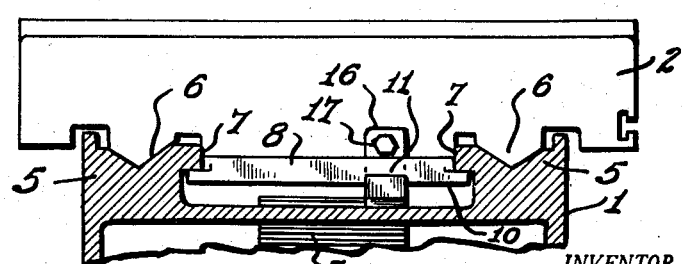
FIG.2.
INVENTOR.
JOHN M. WALTER.
BY Allen & Allen
ATTORNEYS.

Patented Aug. 31, 1948

2,448,200

UNITED STATES PATENT OFFICE 2,448,200

PLANER

John M. Walter, Cincinnati, Ohio, assignor to The G. A. Gray Company, Cincinnati, Ohio, a corporation of Ohio Application May 31, 1946, Serial No. 673,692

7 Claims. (Cl. 90—58)

My invention relates to devices for restoring planer tables into driving relation to the bull gear of the planer drive, on occasions when the table runs off the bull gear. It is not an infrequent condition for the controls of metal planers to permit the table, while still supported on the ways, to move beyond a position of mesh between the rack on the table and the bull gear element of the drive.

To slide the tables back into mesh position with the bull gear under such circumstances is a difficult operation requiring several men and such equipment as a crane or a block and tackle, more particularly in large planers. Even with this equipment which requires time to bring it into position, a close and accurate remeshing is imperative. As will be illustrated in a sketch in the drawings, if accurate mesh is not obtained as the table is manipulated back into position, the initial operation of the bull gear is likely, if it does not break the teeth of the gear or on the rack, to exert such force as actually to break the planer bed or the supports for the planer drive.

An object of the present invention is to so arrange that the bull gear is available for pulling the table back into mesh position. Another object is to insure perfect mesh of the table rack with the bull gear when it is in position. A general object is to provide an attachment for the named purposes which is simple, easy to set up and operate, and which can be stored in a tool box attached to the planer.

An example of my improvement is illustrated in the drawings hereto attached, it being understood that this is but one specific form which my invention may take, and that the novelty inherent in the invention is set forth in the appended claims, to which reference is hereby made.

In the drawings:

Figure 1 is a plan view of one end of a planer bed with the new attachment in place, the table being beyond position of mesh between its rack and the bull wheel.

Figure 2 is an end elevation of the parts shown in Figure 1 on the line 2—2, of Figure 1.

Figure 3 is a side view on the line 3—3, of Figure 1.

Figure 4 is a perspective of the pull rack.

Figure 5 is a perspective of the guide bar.

Figure 6 is a diagram illustrative of the importance of accurate mesh between the table rack and the bull gear, which was noted briefly above.

Referring to Figure 6 there is indicated the teeth A of a bull wheel, and the teeth B of the rack on a planer table. One tooth A is shown as contacting a tooth B. Since the bull gear is very powerful and the line of movement of the bull gear is as indicated by the arrow C, the lifting effect of the bull gear teeth on the rack teeth is tremendous. As already noted, it has been known to crack a heavy planer bed entirely across, or break the drive from its moorings on the bed of the planer.

My invention avoids any such effects.

In the views of Figures 1, 2, and 3, the bed of a planer is indicated at 1, the table at 2, and the bull gear at 3. Beneath the table is a rack 4 which meshes with the bull gear whereby the table is caused to move to and fro on the bed. The bed has ways 5 in which rest the V's 6 of the planer table, and one form of bed construction includes inwardly projecting flanges 7 which are normally engaged by flanges on the table to take side thrust and to hold the table down. Other means lengthwise of the bed to provide for hold down and said thrust, if used, would require obvious modification of the guide bar element of my attachment.

This guide bar as shown at 8, has reduced ends 9 and 10 which engage beneath the flanges 7 on the bed, with the walls or shoulders defining the reduced ends engaging the inwardly projecting faces of the flanges 7. This guide bar has a recess 11 on its under side to accommodate the pull rack.

The pull rack 12 has rack teeth 13 thereon matching exactly those on the bottom of the table. It has a reduced end 14 which will be located in the recess 11 in the guide bar, the wall or shoulder defining this reduced end 14 abutting against the one edge of the guide bar. The pull rack has also a tongue 15, and the planer table has a slot into which this tongue will project. When the tongue is thrust home into the slot so that its defining wall (on the under side of the pull rack) abuts against the wall about the planer table slot, the teeth on the pull rack will match up with those on the rack forming a perfect continuation of the table rack teeth. A lug 16 is formed on the top of the pull rack and a bolt 17 passes through this lug and threadably engages in a suitable hole in the end of the planer table.

While the guide bar and pull rack are shown as separate pieces, they could be a single piece. As already noted the guide bar may take any shape suitable for engaging the guides on the planer bed, normally used for the table.

In use, when the table runs off of the bull gear, it is normally brought up against a stop which prevents it from leaving the bed and while it remains still in engagement with the guides and ways so as to be horizontal. The operator then inserts the guide bar into engagement with the table guides on the bed, inserts the one end of the pull rack into the recess on the under side of the guide bar and places the rack teeth on the pull rack into proper mesh with the bull gear and the same time thrust the tongue on the pull rack into the slot in the planer table. The bull gear is then inched around by small increments so as to thrust the tongue on the pull rack home in the planer table whereupon the bolt 17 is placed and tightened down.

With the parts so arranged, the guide bar will hold the pull rack in position and the bull gear may be inched around in small increments which will pull the planer table toward meshing position. When it reaches meshing position there is no danger of the planer table rack teeth being out of mesh with the bull gear teeth. Thus in a minute or so a single operator is enabled to replace this planer table into operation after an accidental run-off.

While the guide bar has been designed in the example shown so as to slide on the guides for the table, it would be entirely possible to provide for separate guiding means secured to the bed in some way whereby the guide bar would be guided in a like manner. Thus the equivalent, except for economy of structure would be a bracket bolted to the bed in a position to clear the table when in use.

Having thus described my invention, what I claim as new and desire to secure by Letters Patent is:

1. A planer table restorer for a planer having a bed provided with a bull wheel and carrying a table provided with a rack arranged to mesh with said bull wheel comprising a guide element arranged to slidably engage and be guided by elements on the bed, a rack bar element engaging said guide element, said rack bar element having teeth corresponding to those on the table rack and having means for engaging it with the table in such position that its teeth form a continuation of the table rack teeth.

2. The combination of claim 1 in which the engaging means between the table and the rack bar element includes a sliding element and socket therefor, whereby the rack bar element may be placed in proper engagement with the bull wheel of the table drive and by means of the bull wheel be moved to the position already noted, thereby taking up the sliding movement.

3. The combination of claim 1 in which the rack bar element has a tongue thereon, said table having a socket to receive the tongue, and means for securing the table and the rack bar element together, for the purpose described.

4. The combination of claim 1, said planer bed having side thrust and hold-down flanges, in which the guide element has its side edges arranged with shoulders and reduced projections beyond the same for engaging the side thrust and hold down flanges on the plane bed.

5. The combination of claim 1, said planer bed having side thrust and hold-down flanges, in which the guide element has its side edges arranged with shoulders and reduced projections beyond the same for engaging the side thrust and hold down flanges on the planer bed and is recessed on its under side for reception of the end of the rack bar element, the end of said rack bar element having a shoulder and a projection beyond said shoulder to engage in said recess.

6. The combination of claim 1 in which the guide element is independent of the rack bar element, and has a socket and shouldered tongue detachable connection with the rack bar element.

7. A restoring device for planer tables in planers having a bed with guides, and a table provided with a rack comprising a rack bar having a reduced thickness tongue at one end, and a lug at said end having passage for a securing bolt, said rack bar having a reduced tongue at the other end, and a guide bar having reduced ends to engage the bed guides for the planer table, and a socket for the reduced tongue at said other end of the rack bar, the teeth on the rack bar being so arranged that its teeth will form a perfect continuation of the teeth of the rack on said table when the lug is bolted home against the planer table.

JOHN M. WALTER.

REFERENCES CITED

The following references are of record in the file of this patent:

UNITED STATES PATENTS

| Number | Name | Date |
|---|---|---|
| 1,486,144 | Jarrell | Mar. 11, 1924 |